United States Patent [19]

Statler

[11] Patent Number: 5,146,941
[45] Date of Patent: Sep. 15, 1992

[54] HIGH TURNDOWN MASS FLOW CONTROL SYSTEM FOR REGULATING GAS FLOW TO A VARIABLE PRESSURE SYSTEM

[75] Inventor: William O. Statler, Scotia, N.Y.

[73] Assignee: Unitech Development Corp., Schenectady, N.Y.

[21] Appl. No.: 758,672

[22] Filed: Sep. 12, 1991

[51] Int. Cl.$^5$ .............................................. G05D 7/06
[52] U.S. Cl. ........................................ 137/8; 137/468; 137/486; 137/487.5
[58] Field of Search .................... 137/486, 487.5, 468, 137/8

[56] References Cited

U.S. PATENT DOCUMENTS

| | | | |
|---|---|---|---|
| 3,820,556 | 6/1974 | Miller | 137/486 X |
| 4,146,051 | 3/1979 | Sparks | 137/486 |
| 4,796,651 | 1/1989 | Ginn et al. | 137/8 |
| 4,813,443 | 3/1989 | Pounder | 137/486 X |
| 4,840,350 | 6/1989 | Cook | 137/487.5 X |

*Primary Examiner*—Alan Cohan
*Attorney, Agent, or Firm*—Schmeiser, Morelle & Watts

[57] ABSTRACT

A high turndown mass flow control system for the regulation of gas flow to a variable pressure system such as a gas turbine engine. The herein described system controls the flow of gas into a load system where the gas delivery pressure at the load varies directly as a function of the mass flow. The system employs flow control and mass flow measurement subsystems, controlling the mass flow to maintain a mass reference value called for by an outside master control. Flow control apparatus includes a throttling control valve while the flow measurement subsystem includes a flow restriction element, $\delta P$, pressure and temperature transducers while using a flow calculation algorithm to calculate the actual gas mass flow passing through the system. The high turndown mass flow control characteristic of the invention acquired by an unique placement and usage of the gas restriction element allows the reading of $\delta P$ parameters with conventional instrumentation.

8 Claims, 2 Drawing Sheets

# HIGH TURNDOWN MASS FLOW CONTROL SYSTEM FOR REGULATING GAS FLOW TO A VARIABLE PRESSURE SYSTEM

BACKGROUND OF THE INVENTION

1. Field of the Invention

This invention relates generally to gas mass flow control systems and, specifically, to one having a high turndown regulation means for controlling the gas mass flow to a variable pressure system.

2. Discussion of the Relevant Art

Current gas flow control systems which regulate gaseous fuel flow to a variable pressure system, such as a combustion engine, attempt to regulate pressure first, and then, fuel flow control. Illustrative of relevant gas fuel flow control systems are those disclosed in U.S. Pat. No. 4,146,051, issued to Sparks, and U.S. Pat. No. 4,796,651 issued to Ginn et al. Sparks employs, in a gas flow control system, a variable metering device, a circuit for generating a first electrical signal which is a function of a desired gas flow through the metering device, a circuit for generating a second electrical signal which is a function of the gas pressure upstream of the metering device, and control means which is responsive to the first and second electrical signals, for varying the effective flow area of the metering device. Of notable distinction in the Sparks patent is the teaching of the variable metering device which, in addition to serving as a restriction in the system fuel flow, also physically effects variability in the flow. Ginn et al. teach a method and apparatus for measuring gas flow volume in a system which references the total pressure upstream of a bypass orifice in order to produce a first signal representative of the differential pressure between the total pressure upstream and of the orifice and the static pressure downstream of the orifice. The first and a second signal, which is related to the area of the opening in the orifice, are supplied to a gas flow volume data base which is then correlated to the sensors and to the orifice in the duct. The control means of the system references a library or lookup table and divulges the gas flow volume (not mass) occurring in the duct. Thus, current systems do not control the flow of gas (by mass rate flow) into a load system where the gas delivery pressure at the load varies directly as a function of the mass flow.

SUMMARY OF THE INVENTION

In the hereinafter disclosed invention, a comparison of the apparatus and theory, as well as advantages/disadvantages will be made between the invention and current art. By reference to a variable pressure system it is meant a system operating through a range of pressures such as a turbine combustion system. Upstream, midstream and downstream are relative terms which shall mean, generally, upstream of a flow restriction element (FRE), midstream, means where the flow restriction element (FRE) actually is situate, and downstream (which is the general location of the load or the variable pressure system consuming the gaseous fuel) means at least downstream of the FRE. Finally, by high turndown, it is meant the ratio of a maximum quantity to a minimum of said quantity. In the instant application, a system having a high turndown control possesses control means which has an extended range(ability) for determining pressure differential ($\delta P$) parameters of the system instrumentation.

The system of the instant invention regulates gas flow to a downstream variable pressure system, such as a combustion unit, and comprises flow control and mass flow measurement subsystems. The system acts to control the mass flow in order to maintain the mass value ($W_r$) called for by an outside master control. The upstream flow control portion comprises a throttling control valve and an associated controller. The flow measurement, at midstream, includes a flow restriction element (FRE), delta-pressure ($\delta P$), pressure (P) and temperature (T) transducers (detector/signal transmitters), and applies a flow calculation algorithm calculating the actual gas mass ($W_g$) flow passing through the system. The T transducer may alternately be located downstream, but proximate the FRE.

DETAILED DESCRIPTION OF THE PREFERRED EMBODIMENT

A major factor to be considered in determining fuel mass flow control or regulation of mass flow rate ($W_g$) is the ability to accurately and objectively determine $W_g$ by calculation (algorithm), without having to resort to data based calculations which establish, at best, inferential data. According to this invention, system flow through a flow-restriction element is calculated by the following:

$$W_g = K * Y * (Rho)^{\frac{1}{2}} * (\delta P)^{\frac{1}{2}} \qquad \text{(Equation 1)}$$

Where:

$W_g$ is the mass flow rate of the gas in the system;

K is a constant function of the geometry of the element (FRE), the specific gravity of the gas, and unit conversion factor;

Y is the expansion coefficient which is approximated for a fixed geometry and gas specific heat ratio by the expression:

$$Y = [1 - C * (P_i - P_t)/P_i], \qquad \text{(Equation 2)}$$

where

C is a constant;

Rho is the density of the gas at the inlet of the element and is proportional to ($P_i/T_i$);

$\delta P$ is the pressure differential between the inlet of the FRE and the throat, and is equal to ($P_i - P_t$);

$P_i$ and $P_t$ are the absolute pressures at the inlet and throat of the FRE, respectively; and $T_i$ is the absolute temperature at the inlet of the FRE.

From an examination of equation 1, it can be seen that, with a constant value of Rho (essentially a constant value of $P_i$), the value of $\delta P$ will change as the square of the flow, $W_g$. This square function limits the use of this type of flow measurement to a flow range of approximately 10 to 1, resulting in a $\delta P$ range of 100 to 1 which is a practical limit of commercial differential pressure sensors. This is the case if the FRE is located upstream of the control valve where the pressure (and Rho) will be essentially constant, as seen in FIG. 1 (prior art).

Figure 1:
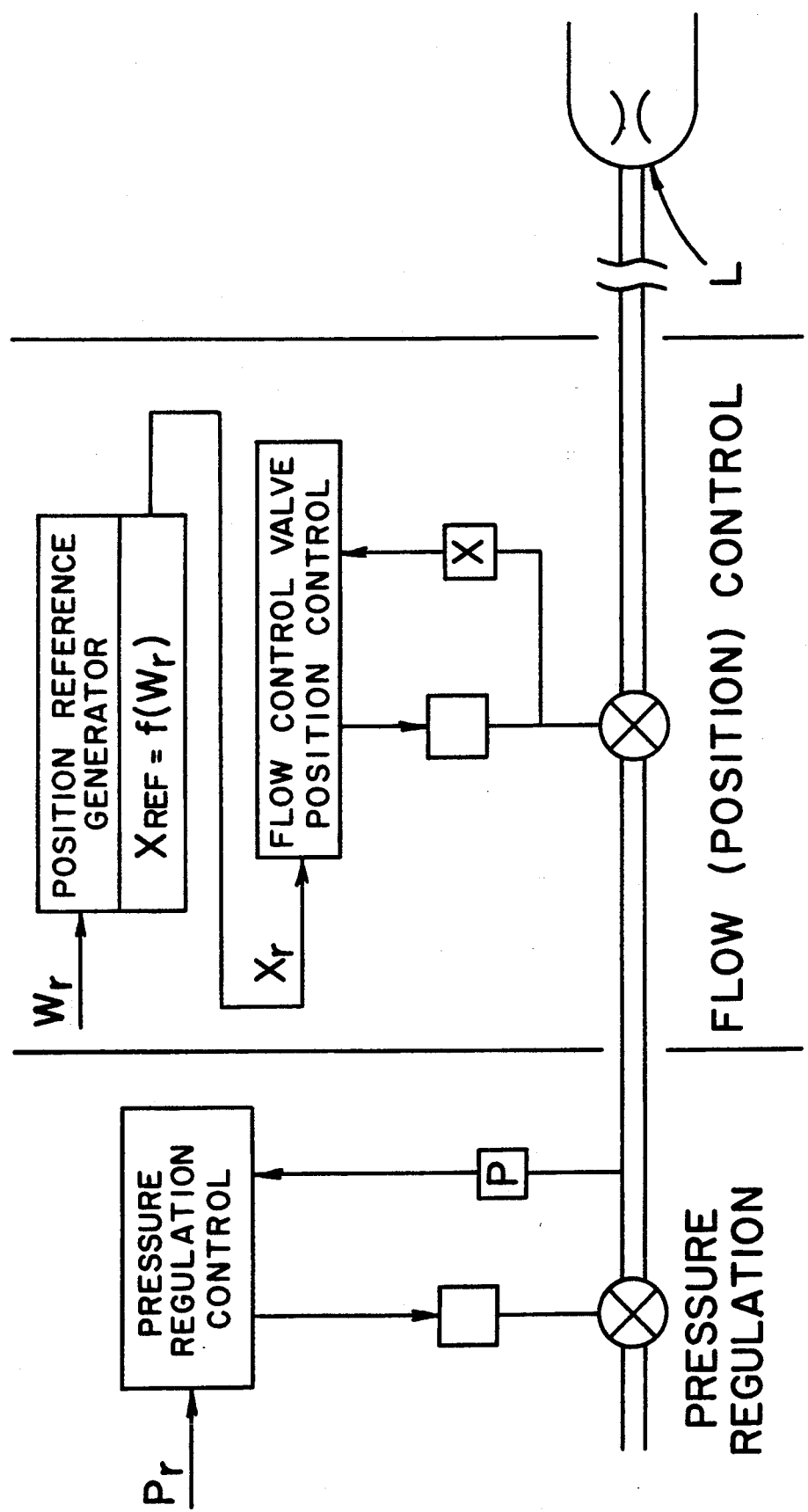
FIG. 1 is a functional diagram of a currently used pressure-flow control system.

Referring more particularly now to FIG. 1 (prior art), there is shown a functional diagram of state of the art control systems used in this service and which typically employ two controlling valves. The first (upstream) valve 32, along with a pressure transmitter 34, and pressure control 36 acts to control the inlet pressure to the second valve 38 as a function of the outlet pressure of the second valve. This pressure is set so that the second valve is operating at a critical pressure ratio. The second valve 38 is then modulated to control the actual flow. This second valve 38 will usually have a flow characteristic which is linear with its stroke, that is, the length of travel or angular distance (of actuation). Since the inlet pressure of this valve is controlled by the first valve 32 to maintain a critical pressure ratio, there results a theoretical linear relationship between the position of the second valve and the mass flow ($W_g$). The flow control loop depicted therein (FIG. 1) uses this theoretical linearity, along with a position transmitter 40 on the second valve 38 and a position control 42 in order to control the flow by controlling the position of the second valve generated in a position referenced algorithm as a function of the mass flow reference ($W_r$); therefore, actual mass flow is never measured by the prior art system.

The systems described by patentees Sparks ('051) and Ginn et al. ('651) use the position of the controlling valve to obtain characteristics necessary in the flow calculation. This is required of Sparks; because therein, the flow restriction element (FRE) is also the control valve. The instant invention, described hereinafter, has no need of determining the control valve position since the flow element is of fixed geometry. Nor is it required that the control valve have any special flow characteristics or a high pressure recovery, as required by Sparks. Where Sparks also requires a flow calculation which spans the range of flow from subcritical (throat MACH number <1) through the transition region into the critical, or choked region (throat MACH number =1), the instant invention system remains well below the choked flow region and has no need to determine the flow realm nor change the flow calculation algorithm.

In the instant invention, the FRE is located downstream of the control valve, the $P_i$ pressure is reduced at low flows, requiring a higher $\delta P$ value for the same mass flow, thereby extending the useful range of the system. The expansion coefficient Y, will increase slightly as $W_g$ decreases, but the overall effect is to increase the $\delta P$ at lower flow.

In the application to the control of gas fuel flow to the combustion system say, of a gas turbine, the fuel flow $W_g$ will range from maximum load to ignition by approximately 20 to 1, while $P_i$ pressure will vary approximately 10 to 1. This changes the $\delta P$ range from approximately 400 to 1 (which is impractical) to 40 to 1, which is well within the range of commercial instrumentation. It is at this point that the highly practical high turndown characteristic of the instant invention more than makes its case, demonstrating both inventive step and significant industrial applicability.

Figure 2:
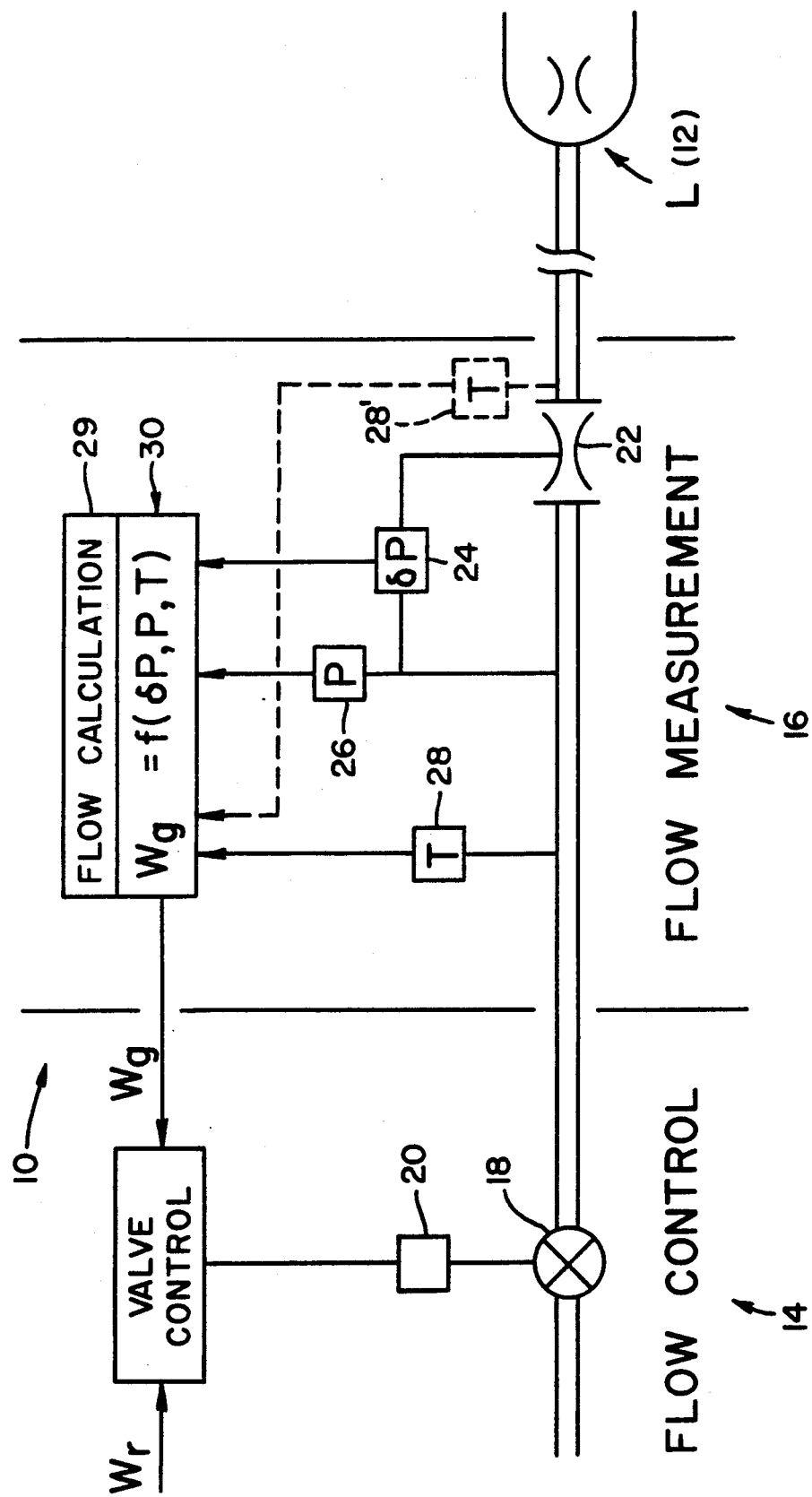
FIG. 2 is a functional diagram of the instant invention flow control-flow measurement system.

The invention 10, a high turndown mass flow system, as described above and depicted by a functional diagram in FIG. 2, acts to control the flow of gas into a load system where the gas delivery pressure at the load 12 varies directly as a function of the rate of mass flow $W_g$. A typical application would be the control of gas fuel into the combustion subsystem of a gas turbine engine.

The system 10 regulates gas flow to a downstream variable pressure system such as the aforementioned combustion unit (load L) and comprises flow control 14 and mass flow measurement 16 subsystems. The system 10 acts to control the mass flow in order to maintain the value $W_r$) called for by an outside master control. The upstream flow control portion comprises a throttling control valve 18 and an associated valve controller 20. The flow measurement at midstream portion includes a flow restriction element (FRE) 22, $\delta P$ 24, pressure 26, and temperature 28, (28' alternate position) transducers or detector/signal transmitters, and employs a flow programmable microprocessor 29 for the calculation of an algorithm 30 which calculates the actual gas mass ($W_g$) flow passing through the system $W_g$ is correlated with $W_r$ and valve control 20 is adjusted to nullify the $W_g - W_r$ difference. The flow algorithm uses a T at or proximate the FRE inlet. It is also measured physically at a slight distance downstream (at 28') of the FRE. Any error is negligible; the rationale for this variance being simply the desirability of avoiding any turbulence at the FRE inlet caused by instrumentation thermowell(s).

The unique feature of the system 10 is that the flow restriction element is used downstream of the throttling control valve 18, but upstream of the gas-consuming variable pressure system (L). The FRE 22 may be an orifice plate, a flow nozzle or a venturi tube. As will be hereinafter described, this location allows the system to be applied across a wider range of flows than would be the case if the element were to be located in the more conventional position upstream of the throttling control valve.

Thus, when compared with the current art (as depicted in the patents issued to Sparks and Ginn et al.), the advantages of the herein disclosed invention are readily apparent. First, the control and metering elements are kept separate and uncoupled, therefore requiring no control valve position information in the flow calculation. Second, both the control valve and flow restriction elements are standard, commercially available hardware, requiring no special design. Third, the flow calculation does not require a choke vs. non-choke- determination plus two flow algorithms (such as Sparks), nor a lookup table/data base (such as for the damper valve flow characteristic of Ginn et al.). Finally, while actual pressure drops are not quoted in the prior art, notably Sparks, it is certain that the total maximum flow pressure loss in the instant system will be less, due to the insistence of Sparks on maintenance of choked flow. If a high recovery venturi is used as the restriction, such as in the instant system, the pressure loss across this element will be negligible. The loss across the control valve can be kept low by proper selection of the trim valve and flow coefficient vs. stroke characteristic. The latter control technique is well within the scope of competence presently available in the art.

By comparison to the overall present state of the art systems, the advantages of this invention become even more pronounced:

1. It is less (physically) complex having only one modulating valve;
2. It directly controls mass flow by actually measuring it and using the measured value as a feedback in a flow control loop (the present-state systems actually control a valve position and require an inference of flow control from the relationship between discrete positions and flow); and 3. The total flow control system pressure drop is greatly reduced because of the elimination of one valve, which must operate at a critical pressure drop, and its replacement with the flow metering element having a lower drop. This is particularly true, and of significant value, if the metering element is a high recovery venturi type, such as I recommend.

Those having skill in the systems control discipline will readily ascertain the economic and technical advantages of applying the teachings as expressed herein. Variation in types of restrictive devices will undoubtedly lead to refinement in the invention without undue departure from the spirit thereof or from the ambit of the hereinafter appended claims.

What is claimed is:

1. A method for controlling the flow within a conduit of a gas fluid stream into a load system by using a fixed restriction device with conventional instrumentation and where gas pressure at an inlet of the system is strong function of mass flow of the gas, the method comprising:

establishing control over gas flow in the conduit means by use of a single valve responsive to control signals derived from a functional calculation on data collected on stream flow measurement wherein said data are taken proximate a gas flow restricting means;

placing a fixed flow gas restricting element downstream of the single valve and upstream of the load system;

determining, in said gas fluid stream, a temperature and inlet pressure at a first point in the stream, a pressure differential between said first point, taken immediately before and upstream of said restricting element and a second point located within the restricting element; whereby upon said determining of temperature, pressure and pressure differential, calculating a true gas mass flow rate, $W_g$, correlating $W_g$ with a desired reference gas mass flow, $W_r$; and thereafter physically actuating the single valve to nullify the difference between $W_r$ and $W_g$ by altering the stream passing through said single valve.

2. The method of claim 1 wherein calculating further comprises solving the equation: $W_g = K*Y*(Rho)^{\frac{1}{2}}*(\delta P)^{\frac{1}{2}}$, where:

$W_g$ is the mass flow rate of the gas;

K is a constant function of the geometry of said element, specific gravity of the gas, and a unit conversion factor;

Y is an expansion coefficient which is approximated for a fixed geometry and gas specific heat ratio by the expression: $Y = [1 - C*(P_i - P_t)/P_i]$, where C is a constant;

$P_i$ and $P_t$ are absolute pressures at an inlet and the throat, of the element, respectively;

$T_i$ is the absolute temperature at the inlet of the element;

Rho is density of the gas at an inlet of the element and is proportional to $(P_i/T_i)$; and $\delta P$ is a pressure differential between the inlet of the element and the throat thereof, and is equal to $(P_i - P_t)$.

3. The method of claim 2 wherein calculating further comprises computing $W_g$ by microprocessor means.

4. In a system for controlling gas flow through a conduit which feeds gaseous fuel to a downstream variable pressure consumption machine, having within said conduit a single valve disposed upstream of the machine, an improved method for controlling gas mass rate flow to the machine comprising:

placing in the conduit, between the valve and the machine, a gas flow restriction having an inlet and a restriction point therein, both inlet and point being of known fixed parameters, the restriction means being afforded a first gas pressure data collection means at the point;

locating in the conduit and proximate the flow restriction means, a temperature data collection means and a second gas pressure data collection means;

providing computation means for gathering data from all aforesaid data collection means and processing the data in order to solve a flow measurement ($W_g$) equation that is a function of temperature data, first gas pressure data, second gas pressure data and pressure differentials relative the first and second gas pressure data; and comparing the $W_g$ to a desired reference gas mass flow, $W_r$, and determining an amount of actuation of the valve necessary to increase/decrease flow inteh conduit in order to compel an equation of $W_g$ to $W_r$.

5. An apparatus capable of controlling the mass flow rate of gas, $W_g$, through a conduit which carries a gas fuel stream to a variable pressure system comprising:

a gas flow restriction means, having disposed therein pressure-sensing transducing means and, positioned within the conduit means immediately upstream of the variable pressure system, the restriction means having an upstream inlet and a most restrictive point termed the throat;

pressure transducing means and temperature transducing means located in said conduit, said pressure transducing means disposed immediately upstream of said restriction means and said temperature transducing means disposed proximate said restriction means;

microprocessor means connected to outputs of said temperature and pressure transducer means immediately upstream of the restriction means and further receptive of pressure differentiation data derived by differentiating the upstream-located pressure transducer means data and those data derived from the restriction means-disposed pressure transducer means, said microprocessor means programmed to solve a flow calculation equation resulting in gas mass flow rate $W_g$;

comparison means for determining the difference between $W_g$ and a reference gas mass flow $W_r$, said comparison means associated with valve control means; and a single valve means within the conduit means and upstream, but proximate, all aforesaid conduit-disposed elements, said valve responsive to open-/close actuation by said valve control means.

6. The apparatus of claim 5 wherein said restriction means comprises a venturi.

7. The apparatus of claim 5 wherein said restriction means is a flow nozzle.

8. The apparatus of claim 5 wherein said restriction means is an orifice plate.

* * * * *